US007959756B2

(12) United States Patent
Zimmermann

(10) Patent No.: US 7,959,756 B2
(45) Date of Patent: Jun. 14, 2011

(54) SMALL HANDLE PRODUCTION METHOD AND APPARATUS

(76) Inventor: Roger Zimmermann, Hatley, WI (US)

( * ) Notice: Subject to any disclaimer, the term of this patent is extended or adjusted under 35 U.S.C. 154(b) by 971 days.

(21) Appl. No.: 11/839,579

(22) Filed: Aug. 16, 2007

(65) Prior Publication Data

US 2008/0042334 A1 Feb. 21, 2008

Related U.S. Application Data

(60) Provisional application No. 60/822,578, filed on Aug. 16, 2006.

(51) Int. Cl.
*B23P 17/00* (2006.01)

(52) U.S. Cl. .......... 156/293; 156/294; 156/423; 142/53; 142/56

(58) Field of Classification Search .................. 156/294, 156/293, 423; 142/53, 56
See application file for complete search history.

(56) References Cited

U.S. PATENT DOCUMENTS 3,683,484 A * 8/1972 Kolster et al. .................. 29/416

* cited by examiner

*Primary Examiner* — Jeff H Aftergut
*Assistant Examiner* — Jaeyun Lee
(74) *Attorney, Agent, or Firm* — Lane Patents LLC

(57) ABSTRACT

A way of making small, fragile, decorative handles on a lathe is disclosed along with tools for gluing pen-tubes into these handles is shown. Use of these tools and methods of use allows wood turners to avoid excessive rework and mess associated with the gluing process of making pen blanks while assuring better product due to more complete and uniform distribution of the adhesive layer.

7 Claims, 3 Drawing Sheets

SMALL HANDLE PRODUCTION METHOD AND APPARATUS

CROSS-REFERENCE TO RELATED APPLICATIONS

The present application is a continuation-in-part application of U.S. provisional patent application Ser. No. 60/822,578; filed Aug. 16, 2006, for SMALL HANDLE PRODUCTION METHOD AND APPARATUS, included by reference herein and for which benefit of the priority date is hereby claimed.

FIELD OF THE INVENTION

The present invention relates to making intricate handles involving hand turning blanks on a lathe and, more particularly, to apparati and methodology used in inserting hollow support structures for making small, fragile, blanks on a lathe that form the basis for novelty items such as handles for pens, pencils, magnifiers, laser pointers, letter openers and the like. This apparatus and methodology can also be adapted for making larger or smaller blanks by simply scaling the dimensions of the device.

BACKGROUND OF THE INVENTION

Many people turn to woodworking these days for enjoyment, to relieve stress, and the fulfillment of making a unique and interesting expression of their creativity. One area of woodworking is in making blanks which are often intricate and with decorative coverings which are machined or turned on a lathe. They are often made of wood or other generally soft non-wood material which contains an interesting visual pattern. The blank often forms the handle portion of an item. It is often hollow to hold useful mechanisms for pens, laser pointers, whistles, mechanical pencils, and the like.

The craftsman crafts the blank by drilling or boring a hole through the blank, then shaping or turning the blank with the inserted pen-tube on a lathe or other apparatus to define the outward shape or appearance of the blank in an artful way. Many times the walls of the blank become very thin and fragile requiring reinforcement from breaking. This is typically accomplished by gluing a pen-tube into the blank.

Pen-tube is a term generally used to mean a cannulus or tube, usually metallic or other suitable material, which is inserted and glued into the blank. The standard pen-tube size is 7 mm but can come in other sizes. The present invention can accommodate handheld objects with similarity to pen-tubes, at any diameter. The pen-tubes are also used to provide a means for attaching the blank to another object such as to an end of a magnifying glass, or to house a mechanism for a pen or mechanical pencil or other item. It is not restricted only to making a pen, but may be any useful object requiring a substantially hollow handle.

Gluing a pen-tube into a blank can be a messy and inefficient process. The craftsman must assure that an even and complete distribution of adhesive is applied throughout the inside of the drilled hole. Without an even distribution of adhesive, the pen-tube may come loose over time.

Another concern is that any delamination of the blank from the pen-tube will not provide adequate support to machine the blank causing the blank to fracture or vibrate in the lathe due to the extremely thin tolerances in the turning process. If too much adhesive is applied it finds its way to the craftsman's hands which is not only inconvenient, but messy. In the severe case it may require the entire piece to be reworked or scrapped.

Many times before inserting a pen-tube into a blank, adhesive is also spread over the pen-tube while holding it between the craftsman's fingers. It is then inserted into the blank. At this time glue may get stuck to the craftsman's fingers was well as be pushed into the leading end of the pen-tube as it is being inserted.

Adhesive that is pushed forward into the pen-tube can extrude from the distal end which is also a problem. Build up inside the pen-tube blocks the pen-tube such that it cannot be securely mounted to a lathe mandrel for further processing. When the pen-tube is blocked, a drill or other such device must be used to clean out the inside of the pen-tube.

There is currently a tool marketed to aid the insertion of pen-tubes into turning blanks. It consists of a tapered rod with a handle. The tapered rod is inserted into one end of the pen-tube and then pushed into the drilled hole of the turning blank.

While the prior art accomplishes the task of inserting a pen-tube into a blank, it allows adhesive to build up inside of the pen-tube. This adhesive prohibits the mounting of a turning blank with inserted pen-tube onto the lathe mandrel. Therefore any adhesive inside the pen-tube must be removed by some means prior to mounting. This is a time consuming and difficult process. The best alternative is to avoid any adhesive from entering the pen-tube during the gluing process.

Another attempt at solving this problem requires coating the leading end of the pen-tube with a thin coat of paraffin or other wax to protect and seal the end. While this helps prevent the deposition of adhesive inside of the pen-tube, it still requires the extra step to remove the wax before further processing.

The prior art is only concerned with pushing the pen-tube into the turning blank. There's no way to retract a pen-tube once it has been inserted into a blank. This makes it difficult to rotate the pen-tube and move it back and forth in an axial fashion to ensure even distribution of an adhesive layer between the pen-tube and the inside of a turning blank. A failed glue-up can render a pen blank unusable thus sacrificing the cost of the pen-tube and the blank and labor costs.

It is therefore an advantage of the invention to ensure a complete and even distribution of adhesive between a pen-tube and blank.

It is another advantage of the invention to allow the application of various adhesives.

It is another advantage of the invention to minimize or eliminate getting adhesive on the craftsman's hands.

It is another advantage of the invention to devise a method to cleanly apply adhesive to the outside of the pen-tube before it is inserted into the blank.

It is another advantage of the invention to allow the rotation of the pen-tube in a circular as well as an axial fashion to further ensure even distribution of the adhesive.

It is another advantage of the invention to minimize or eliminate adhesive from depositing on the inside of the pen-tube.

It is another advantage of the invention to be able to scale the pen-tube insertion tool to fit a multitude of pen-tube diameters and lengths.

It is another advantage of the invention to insert the pen-tube and remove it easily during a dry fit test.

It is another advantage of the invention to optimize the spreading of adhesive on the leading edge of a pen-tube as inserted by means of a parabolic cone on the leading edge.

SUMMARY OF THE INVENTION

Brief Description of the Drawings

A complete understanding of the present invention may be obtained by reference to the accompanying drawings, when considered in conjunction with the subsequent, detailed description, in which.

For purposes of clarity and brevity, like elements and components will bear the same designations and numbering throughout the Figures.

DESCRIPTION OF THE PREFERRED EMBODIMENT

Figure 1:
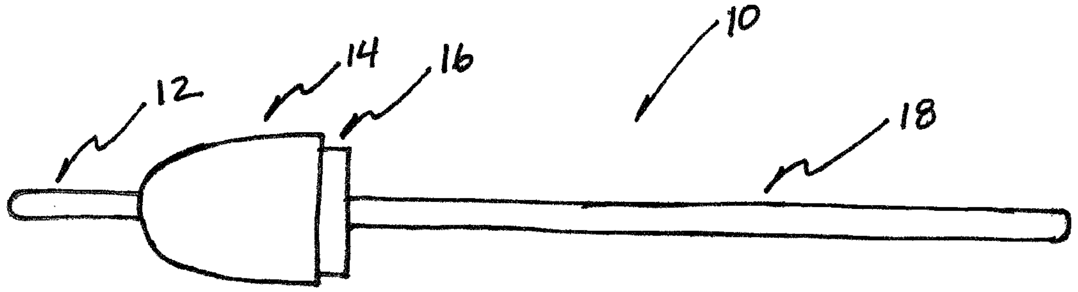
FIG. 1 is a side view of a pen-tube insertion tool shaft and insertion tip.

FIG. 1 is a side view of the pen-tube insertion shaft tip and assembly (10) which consists of an insertion shaft distal extension (12) for removing the pen-tube insertion shaft tip and assembly at a step that will be shown hereafter. Approximately one inch behind the leading end of the insertion shaft distal extension (12) is the insertion tip (14). The insertion tip (14) is approximately equal in diameter to the outer diameter of the pen-tube (40) introduced in FIG. 4. The preferred shape for the insertion tip (14) is a substantially parabolic cone as this has been shown to be optimal to distribute and spread the adhesive. But most any shape can be used. The insertion seal and alignment guide (16) is approximately equal in diameter to the inner diameter of the pen-tube (40). This allows the pen-tube to fit over the insertion seal and alignment guide (16) and seals the inside to keep adhesive (64) from working its way into the pen-tube. Immediately connected with the insertion tip (14) is the insertion shaft (18). The insertion shaft (18) should be long enough to function properly as will be explained hereafter. The diameter is not critical, but should be matched to the diameter of the guide slot (30) which is first introduced in FIG. 2.

Figure 2A:
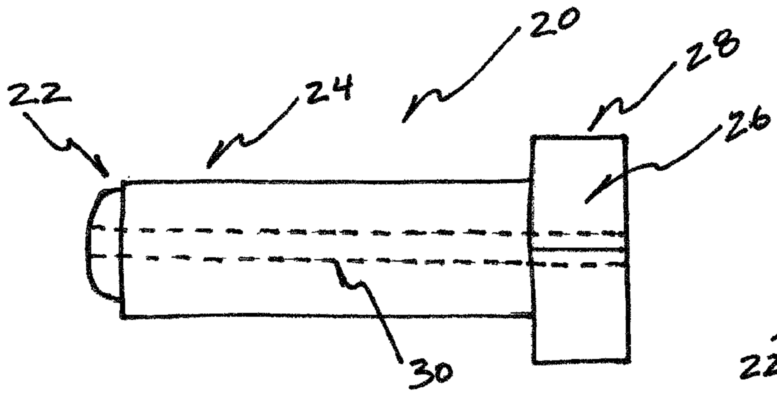
FIG. 2*a* is a side sectional view of a pen-tube insertion tool driver.
Figure 2B:
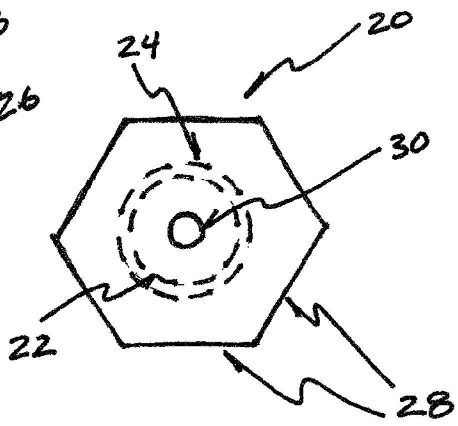
FIG. 2*b* is a bottom sectional view of a pen-tube insertion tool driver.

FIGS. 2*a* and 2*b* are a side sectional view and bottom sectional view respectively of a driver tool (20). The function of the driver tool is to hold the trailing end of the pen-tube (40) in place along with other advantages that will become apparent as the discussion continues. The pen-tube driver is comprised of a driver seal and alignment guide (22) which performs essentially the same constraints and functions as the insertion seal and alignment guide (16). Immediately connected with the driver seal and alignment guide (22) is the barrel (24). The barrel (24) is approximately equal in diameter to the outer diameter of the pen-tube (40). The length of the barrel (24) should be sufficient to keep adhesive (64) from working onto the driver handle (28) during the gluing operation. The driver handle (28) is connected with the barrel (24) and gives the craftsman a handle for extraction of the driver tool (20) at the appropriate step of the gluing process. It should be larger in cross-sectional area than the barrel (24). It has also been found that one or more facets or faces (26) is useful to keep the driver tool (20) from rolling off the table after being set down. A guide slot (30) runs down the center of the driver tool (20) and is slightly larger in diameter than the insertion shaft (18).

Figure 3:
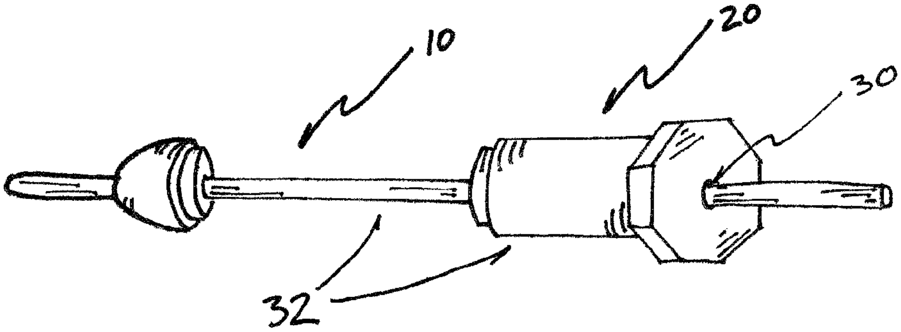
FIG. 3 is a side perspective view of a pen-tube insertion tool driver mounted onto a pen-tube insertion tool shaft.

FIG. 3 shows a side perspective view of a pen-tube driver tool (20) mounted onto a pen-tube insertion shaft tip and assembly (10). The guide slot (30) allows the driver tool (20) to mate with the pen-tube insertion shaft tip and assembly (10) in such a way that the insertion seal and alignment guide (16) and the driver seal and alignment guide (22) can be aligned to hold pen-tubes (40) in a variety of lengths.

Figure 4A:
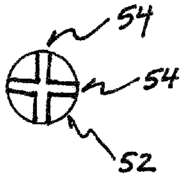
FIG. 4*a* is a front view of the end of a holding rod showing the expansion slot arrangement.
Figure 4:
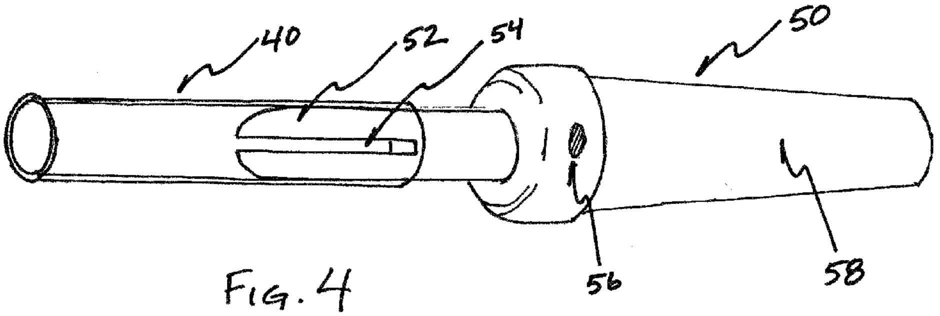
FIG. 4 is a side perspective view of a pen-tube roughing tool inserted into a pen pen-tube.

FIG. 4 shows a side perspective view of a pen-tube roughing and reaming tool (50) inserted into a pen-tube (40). The roughing and reaming tool (50) serves two purposes. Firstly it can be used to hold a pen-tube (40) to make it easier to roughen the outside, usually by the process of sanding. Secondly, should glue, adhesive or other foreign matter find its way into the pen-tube (40), the roughing and reaming tool (50) can also be used to ream out the inside. In the event the reamer cannot get all of the glue out of the tube, a stiff copper bristle brush or similar scrubbing item can be inserted into the pen-tube (40) and rotated to remove any residual glue. The roughing and reaming tool (50) is comprised of a holding rod (52) which is slightly smaller in diameter than the pen-tube (40) being worked on. An expansion slot (54) or plurality of expansion slots are cut into the end of the holding rod (52) and the ends are flared out slightly to provide a friction fit. The pressure exerted must be sufficient to prevent the pen-tube (40) from spinning with roughing with sandpaper while being turned on a lathe. The length of the holding rod (52) should be such that it can adequately support the pen-tube (40). A pry hole (56) is provided to allow easy extraction of the handle (58) from a lathe. The handle (58) is generally provided with a morse taper to facilitate mounting the roughing and reaming tool (50) onto a lathe.

FIG. 4A shows a front view of a holding rod (52) showing one possible arrangement for expansion slots (54).

FIGS. 4 through 10 illustrate how the above-described tools are used to secure a pen-tube (40) into a turning blank (60). FIG. 4 shows how the pen-tube (40) is mounted onto the roughing and reaming tool (50). It is then sanded lightly to roughen the surface which allows for better glue adhesion to the pen-tube.

Figure 5:
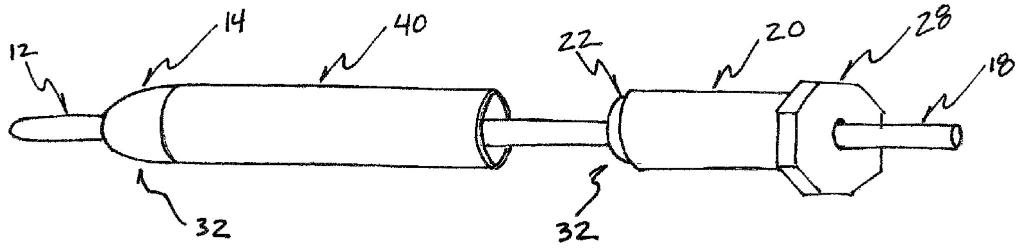
FIG. 5 is a side perspective view of a pen-tube insertion tool assembly which consists of pen-tube being mounted onto a pen-tube insertion tool shaft followed by a pen pen-tube insertion tool driver mounted behind it.

FIG. 5 shows a side perspective view of a pen-tube (40) being mounted onto a pen-tube insertion shaft tip and assembly (10). The leading end of the pen-tube (40) is fitted over the insertion seal and alignment guide (16) (not shown). Then the driver is slipped onto the insertion shaft (18) and fitted to the pen-tube (40) such that the driver seal and alignment guide (22) is covered by the trailing end of the pen-tube (40).

Figure 6:
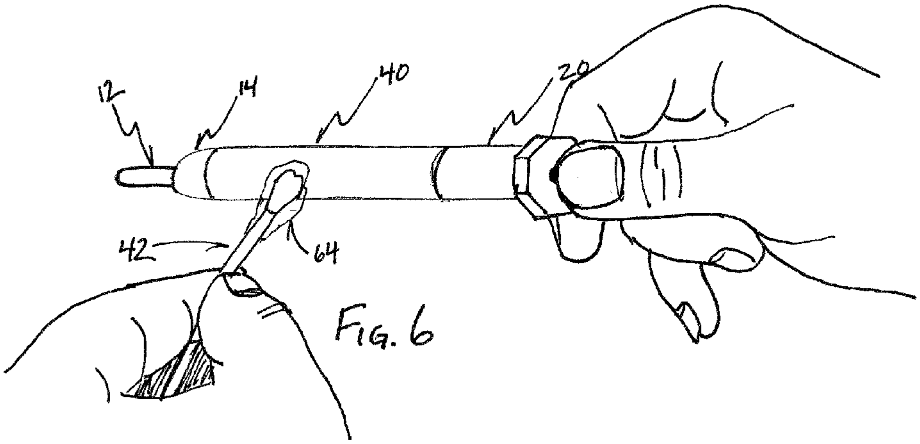
FIG. 6 is a side perspective view of a hand holding a pen-tube insertion tool assembly with a pen-tube between an insertion tip and the leading end of a driver assembly such that adhesive can be applied.

Adhesive application on the completed assembly is illustrated in FIG. 6. During this step the craftsman grasps the trailing end of the insertion shaft (18) in a way to apply direct pressure to the back of the driver handle (28) to hold the entire assembly in place. With the opposite hand, the craftsman applies adhesive (64) to the pen-tube (40) with an adhesive applicator (42). It is important to cover the pen-tube (40) evenly and completely. There is no need to worry about adhesive (64) that finds its way to the insertion tip (14) or the barrel (24). The seal and alignment guide (16) and the driver seal and alignment guide (22) are designed to keep adhesive (64) only where it belongs. The craftsman may also choose to apply adhesive to the cavity (62) of the turning blank (64).

Other methods of locking down the assembly have been examined and found to be more cumbersome than the craftsman simply holding it in place. The addition of various holding and locking schemes to hold the pen-tube insertion tool driver (28) in place can be added if preferred.

Figure 7:
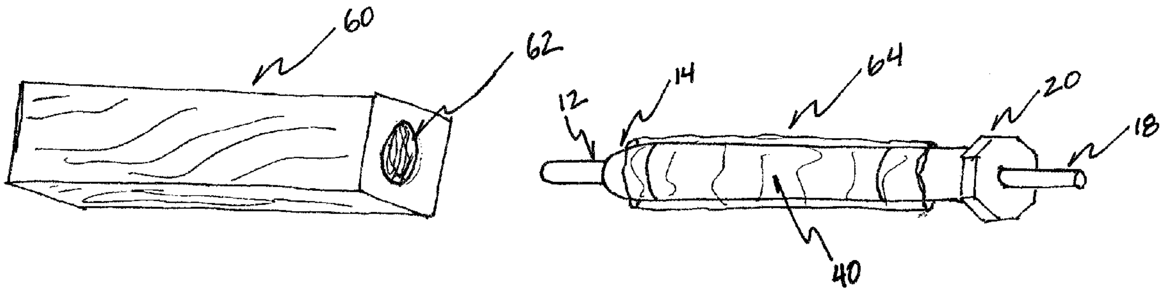
FIG. 7 is a side perspective view of a pen-tube insertion tool assembly with adhesive being inserted into a turning blank.

FIG. 7 is a side perspective view of a pen-tube insertion tool assembly (32) being inserted into the cavity (62) of a turning blank (60). The hands are excluded from the view for clarity. The turning blank (60) can be made of various materials which can be turned on a lathe, but typically is a type of wood. The cavity (82) is typically formed by boring or drilling through the turning blank (60) with a bit approximately equal to the outer diameter of the pen-tube (40). The insertion is made with the leading edge of the insertion shaft distal extension (12).

Figure 8:
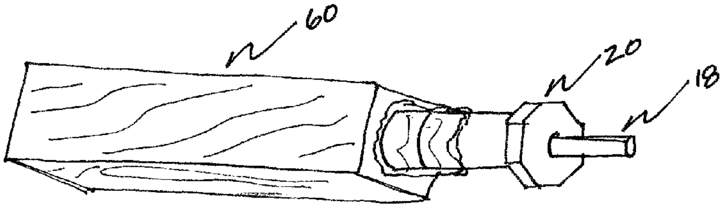
FIG. 8 is a side perspective view of a pen-tube insertion tool assembly partially inserted into a turning blank.

FIG. 8 is a side perspective view of a pen-tube insertion tool assembly (32) partially inserted into a turning blank (60). During this phase of the operation, the craftsman will usually work the pen-tube insertion tool assembly (32) transversely and rotationally to work the adhesive (64) into all crevices in the turning blank (60). Once the craftsman is satisfied that the adhesive (64) adequately couples the pen-tube (40) to the turning blank (60), the trailing edge of the pen-tube (40) is aligned with the face of the turning blank (60).

Figure 9:
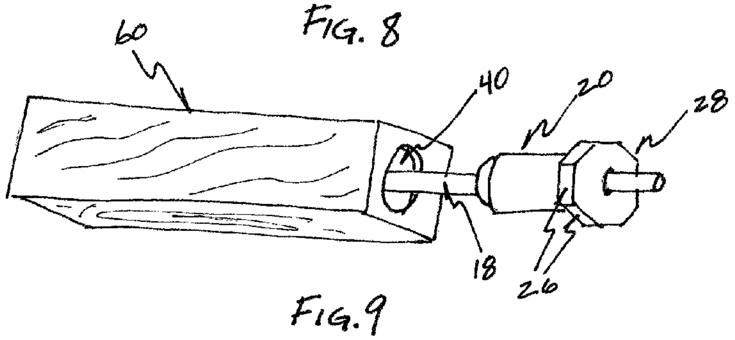
FIG. 9 is a side perspective view of a driver tool being removed from the proximal end of a pen-tube blank.

FIG. 9 is a side perspective view of a pen-tube insertion tool driver (20) being removed from the proximal end of a turning blank (60). This is accomplished by simply holding the turning blank (60) with one hand, while extracting the driver tool (20) by the driver handle (28) with the other hand. The driver tool (20) is then placed on a table top for the rest of the operation. This is where having a facet or face (26) on the driver handle (28) keeps the pen-tube insertion tool driver (20) from rolling around on the work surface.

Figure 10:
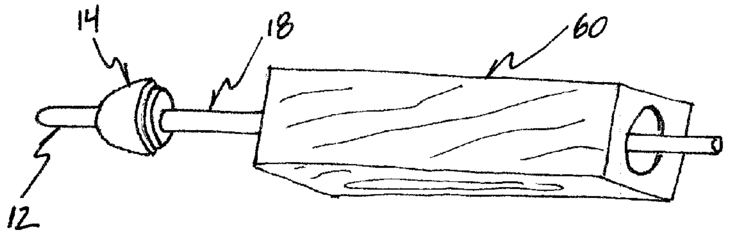
FIG. 10 is a side perspective view of a pen-tube insertion tool being removed from the distal end of a turning blank.

FIG. 10 is a side perspective view of a pen-tube insertion shaft and tip assembly (10) being removed from the distal end of a turning blank (60). This is best accomplished by grabbing the pen-tube insertion shaft and tip assembly (10) by the insertion shaft distal extension (12) and continuing to pull until the insertion shaft (18) is free of the turning blank (60). The turning blank (60) is now fitted with the pen-tube (40) securely in place and can be prepared for turning on the lathe.

Since other modifications and changes varied to fit particular operating requirements and environments will be apparent to those skilled in the art, the invention is not considered limited to the examples chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. An apparatus to aid the insertion of pen-tube into a turning blank for making substantially tubular handles for novelty items, generally on a lathe, comprising: a substantially rod-like pen-tube insertion shaft, tip, and assembly for holding a pen tube for insertion into a blank comprising:

a. an insertion shaft having a proximal and a distal end;

b. an insertion tip located at the distal end of the insertion shaft; wherein the insertion tip being substantially a parabolic cone on the leading edge, and being substantially beveled or tapered on the trailing edge for holding the leading edge of the pen-tube.

2. The apparatus in accordance with claim 1 wherein the trailing edge of the insertion tip further comprises an alignment guide being substantially the same diameter as the inner diameter of the pen-tube.

3. The apparatus in accordance with claim 1 further comprising: a substantially tubular driver tool having a barrel being substantially beveled or tapered on the leading edge for holding the trailing end of pen-tube and a driver handle on the trailing edge for applying pressure to hold the pen-tube in place.

4. The apparatus in accordance with claim 3 wherein the leading edge of the driver tool further comprises an alignment guide being substantially the same diameter as the inner diameter of the pen-tube.

5. The apparatus in accordance with claim 3 further comprising a guide slot which runs substantially down the center of the drive tool and is slightly larger in diameter than the insertion shaft to allow the driver tool to mate with the pen-tube insertion shaft tip and assembly in such a way that the alignment guide of the insertion tip and the alignment guide of the driver tool are aligned to hold the pen-tube.

6. The apparatus in accordance with claim 1 further comprising: an insertion shaft distal extension which extends approximately one inch beyond the leading edge of the insertion tip along substantially the same axis as the insertion tip whereby the insertion shaft distal extension provides a handle for a crafter to remove the insertion shaft from the blank.

7. The apparatus in accordance with claim 1 further comprising: an adhesive applicator for applying adhesive to the pen-tube or the blank.

* * * * *